(No Model.)

R. E. MILES.
CHURN.

No. 471,131. Patented Mar. 22, 1892.

Witnesses.
A. Ruppert
H. A. Daniels

Inventor.
Rebecca E. Miles
Per
Thomas P. Simpson
Atty

UNITED STATES PATENT OFFICE.

REBECCA E. MILES, OF PORTERVILLE, CALIFORNIA.

CHURN.

SPECIFICATION forming part of Letters Patent No. 471,131, dated March 22, 1892.

Application filed September 1, 1891. Serial No. 404,398. (No model.)

*To all whom it may concern:*

Be it known that I, REBECCA E. MILES, a citizen of the United States, residing at Porterville, in the county of Tulare and State of California, have invented certain new and useful Improvements in Churns; and I do hereby declare the following to be a full, clear, and exact description of the invention, such as will enable others skilled in the art to which it appertains to make and use the same.

The special object of the invention is to make a rocking churn in which the cream shall be agitated by one or more rollers moved alternately in opposite directions from one side to the other.

Figure 1:
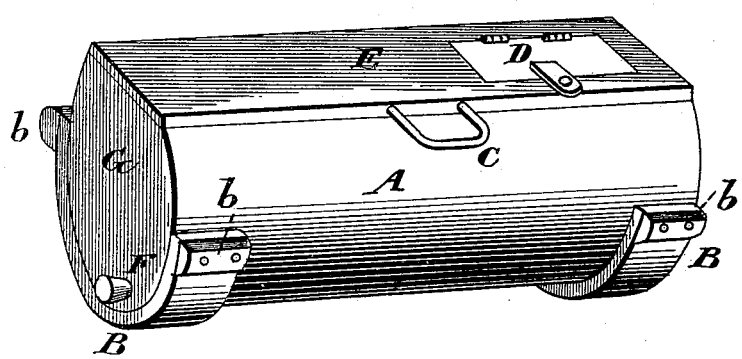
Figure 2:
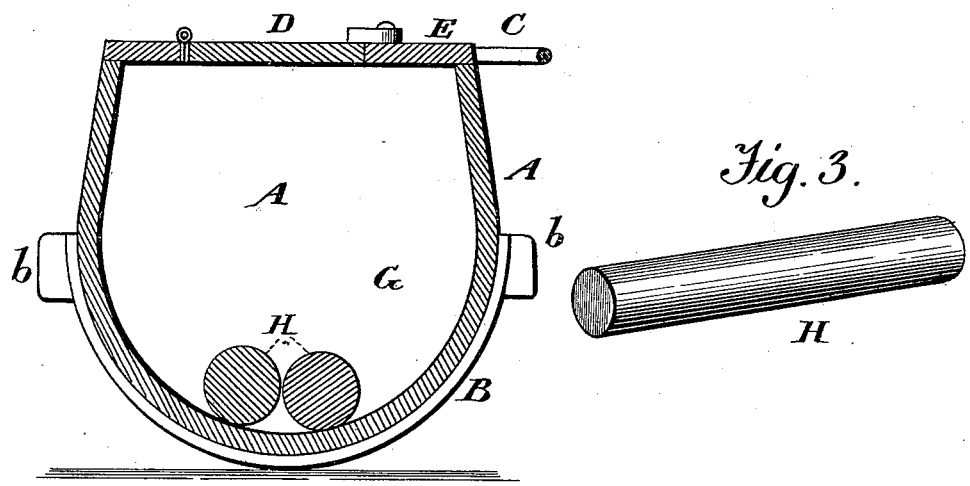
Figure 3:

Figure 1 of the drawings is a perspective view of the churn; Fig. 2, a vertical cross-section, and Fig. 3 a detail view of one of my rollers.

In the drawings, A represents the body of my churn, which is placed upon and attached to the rockers B B, the latter being parallel to each other and adapted to be operated by the foot, hand, or in any other preferred manner like a cradle; or it may be actuated conveniently by means of the handle C.

D is a hinged lid in the top or upper portion E to cover the opening through which the cream is poured into the body A and the butter taken therefrom.

G is one end or head of the churn, provided with the hole F for the outlet of the buttermilk or the water which may be used in the body A.

H is one of my roller-dashers, of which I preferably use two, although more or less may be employed without departing from the principle of my invention.

I prefer to use pure cream of as great consistency or thickness as possible and to heat the milk when strained. The roller should be about five inches in diameter and weigh about six pounds for a three-gallon churn, while for a five to ten gallon churn there should be two such rollers. For churns of still larger size the rolls should be proportionately larger. The rollers need not be removed for cleaning, as they may be washed in the churn, and may be made entirely of wood or have a wooden outside with a filling of metal to give them the desired weight.

*b b* are stops on rockers B B.

This churn has been carefully tried and found in practice well adapted to its purpose.

I am aware that an internally-corrugated tub pivoted in fixed bearings and thus having an unchangeable fulcrum has been used with a corrugated roll, which was thus rotated by the tub, but remained in one position under the fulcrum of said vibrating tub; but

What I claim as new is—

A semi-cylindrical churn-body adapted to be closed at the top and having rockers rigidly attached thereto, said rockers being provided with stops at their outer ends and rollers loosely placed within said body for the purpose of agitating the cream when the churn is rocked, substantially as set forth.

In testimony whereof I affix my signature in presence of two witnesses.

REBECCA E. MILES.

Witnesses:
   I. S. SHEY,
   G. ROUNSEVILLE.